United States Patent [19]

Kawabata et al.

[11] Patent Number: 4,830,874

[45] Date of Patent: May 16, 1989

[54] METHOD OF FORMING BUILT-UP FILM OF J-AGGREGATED ORGANIC DYE

[75] Inventors: Yasujiro Kawabata, Ibaraki; Tatsuo Sekiguchi; Motoo Tanaka, both of Ushiku; Takayoshi Nakamura; Mutsuyoshi Matsumoto, both of Ibaraki; Eiichiro Manda, Ushiku, all of Japan

[73] Assignee: Director-General of Agency of Industrial Science and Technology, Japan

[21] Appl. No.: 107,092

[22] Filed: Oct. 13, 1987

[30] Foreign Application Priority Data

Dec. 2, 1986 [JP] Japan .................................. 61-287530

[51] Int. Cl.$^4$ .............................................. B05D 3/14
[52] U.S. Cl. ........................................ 427/47; 427/402
[58] Field of Search ................................ 427/47, 402

[56] References Cited

U.S. PATENT DOCUMENTS 3,769,011 10/1973 Gilman .................................... 96/1.6
4,105,572 8/1978 Gorondy .......................... 427/47 X
4,513,071 4/1985 May ....................................... 430/19

OTHER PUBLICATIONS

Appl. Phys. Lett., 46 (25), Dec. 22, 1986, pp. 1677–1679.
Journal of Molecular Electronics, vol. 1, 3–17, (1985), pp. 1–17.

Primary Examiner—Bernard Pianalto
Attorney, Agent, or Firm—Lorusso & Loud

[57] ABSTRACT

A method of treating a Langmuir-Blodgett's film which includes one or more built-up monomolecular films of an organic dye is disclosed. The method comprises subjecting the Langmuir-Blodgett's film to a magnetic field to cause the molecules of the organic dye to be aggregated in the J-state.

3 Claims, No Drawings

METHOD OF FORMING BUILT-UP FILM OF J-AGGREGATED ORGANIC DYE

BACKGROUND OF THE INVENTION

This invention relates generally to a method of forming a built-up film of a J-aggregated organic dye and, more specifically, to a method of treating a built-up film of an organic dye with a magnetic field to cause the organic dye molecules to be aggregated in the J-state or to promote the formation of such J-aggregate.

There is known a technique in which a plurality of monomolecular films of an organic dye each developed on the surface of water are built up on a substrate. Such a built-up film having a two-dimensional structure is called "Langmuir-Blodgett's film" (hereinafter referred to simply as LB film for brevity). LB films are useful in application for optically functional materials such as photoelectric transfer elements, optical recording materials, non-linear optical elements or display elements (H. Nakahara, Journal of the Japan Oil Chemist's Society 34, 774-783 (1985)).

Among such LB films, those of a type in which the organic dye molecules are aggregated or associated in the J-state draw a particular attention because the J-aggregated organic dye shows peculiar visible light absorption characteristics, i.e. the absorption band is shifted to a longer wavelength and has a smaller half band width in comparison with the organic dye in the non-aggregated, monomeric state and because the J-aggregated organic dye gives higher photoelectric transfer efficiency and higher luminous efficiency. Thus, LB films of the J-aggregated dye may be also used for irreversible memory and reloadable memory applications.

The term "J-aggregated state" or "J-aggregation" is defined as an aggregation state of dye molecules in which bathochromic shift of the first electronic transition of the dye occurs. For details reference should be made to E. Daltrozzo et al, Photogra. Sci. & Eng. 18, 441 (1974).

One known method for forming or promoting the formation of J-aggregated dye films includes incorporating a long chain hydrocarbon or a long chain fatty acid ester into a dye-containing composition from which monomolecular films are to be prepared. Also known are a method in which LB films are exposed to an atmosphere of ammonia gas, a method in which LB films are exposed to humid conditions and a method in which LB films are exposed to a light or heat. These methods, however, are not advantageous because there is a danger of deterioration of the LB films.

SUMMARY OF THE INVENTION

It is an object of the present invention to provide an effective method of treating an LB film of an organic dye to cause the molecules of the organic dye to be aggregated in the J-state or to promote the formation of such J-aggregates of the dye molecules.

Another object of the present invention is to provide a method of the above-mentioned type which does not cause the deterioration of the LB film.

In accomplishing the foregoing objects, there is provided in accordance with the present invention a method of treating a Langmuir-Blodgett's film which comprises one monomolecular film of an organic dye or a plurality of built-up, monomolecular films of the organic dye, said method comprising subjecting the Langmuir-Blodgett's film to a magnetic field to cause the molecules of the organic dye to be aggregated in the J-state.

Other objects, features and advantages of the present invention will become apparent from the detailed description of the present invention to follow.

DETAILED DESCRIPTION OF THE INVENTION

Preparation of an LB film of an organic dye is known per se and any known preparation method may be used in the present invention. Vertical immersion method and horizontal adhesion method are suitable known examples for the formation of LB films.

Examples of organic dyes especially preferably used for the purpose of the present invention include cyanine dyes, merocyanine dyes and squarylium dyes. Typical examples of these dyes are shown below. The present invention, however, is not limited to these specific dyes.

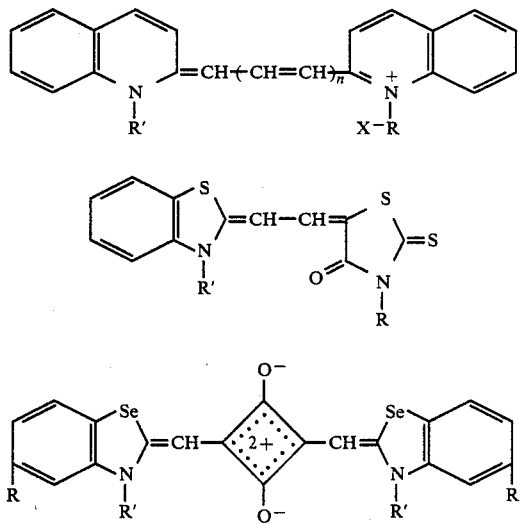

In the above general formulas, R and R' represent independently an alkyl or alkoxy, X is an anion such as a halogen, and n is an integer of 0 or more.

In preparing an LB film, it is possible to use a long chain hydrocarbon, a long chain fatty acid, a long chain alcohol as a matrix for a monomolecular film or films to be built up for the purpose of increasing flexibility of the LB film. Illustrative of suitable matrix materials are n-octadecane, octadecanol, hexadecanol, methyl icosanoate, methyl octadecanoate, icosanoic acid and octadecylamine.

According to the present invention, the LB film is subjected to a magnetic field so that the organic dye molecules of the film are caused to be aggrgated in the J-state or the formation of such J-state aggregation is promoted. The magnetic field to which the LB film is to be exposed preferably has a magnetic field strength of at least 100 G, more preferably at least 1000 G. Whilst a higher magnetic field strength is more effective, a large apparatus becomes necessary to obtain a magnetic field with a strength of 5000 G or more. For this reason a magnetic field strength of 5000 G is an upper preferred limit in the method of the present invention.

In the present invention, the magnetic field may be applied to a limited portion of the J-aggregation dye film using any conventional means such as a disc drive system for floppy discs or fixed discs.

The change of the dye molecules from the non-aggregated, monomer state to the J-associated state is reversible. Application of a heat, contact with a chemical such as HCl or acetic acid vapor or irradiation of a laser beam can convert the J-aggregate dye to non-aggregate dye (T. Fukui et al, Thin Solid Films 109, 247 (1983); M. Sugi et al, ibid 129, 15 (1985); K. Ishimoto et al, Appl. Phys. Lett. 49, 1677 (1986)).

The following examples will further illustrate the present invention.

COMPARATIVE EXAMPLE 1

Equimolar amounts of a squarylium dye of the formula:

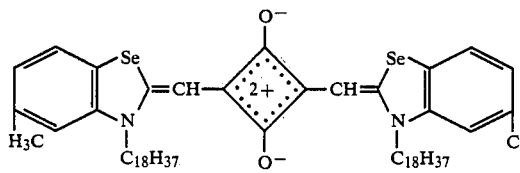

arachic acid and hexadecane were dissolved in chloroform, and the solution was treated in conventional manner to form a monomolecular film on the surface of water containing $4 \times 10^{-4}$M $CdCl_2$ and $5 \times 10^{-5}$M $KHCO_3$. The thus obtained monomolecular film containing the squarylium dye was laminated, in conventional manner at a constant pressure of 25 mNm$^{-1}$, on a substrate which had been previously overlaid with 5 built up layers of cadmium arachate monomolecular films. The lamination of the squarilium dye monomolecular film was repeated 5 times more to obtain an LB film having 6 built up layers of squarylium dye monomolecular films. The resultant LB film was allowed to stand at room temperature (28–38° C.) for 4 days with occasional measurements of visible absorption spectrum. No variation was observed in absorption at 720 nm characteristic to the monomeric squarylium dye.

EXAMPLE 1

Comparative Example 1 was repeated in the same manner as described to obtain an LB film having the same structure as that of Comparative Example 1. The LB film was then immediately exposed continuously to a magnetic field of a permanent magnet with a magnetic field strength of 2700 G. The LB film was so placed in the magnetic field that the hydrocarbon groups of the squarylium dye were oriented in the direction parallel to the magnetic field. Measurement of visible absorption spectrum revealed that the absorption at 720 nm was decreased after 1 day from the commencement of the treatment with the magnetic field while a new absorption appeared at 780 nm. After 4 days, the broad absorption at 720 nm almost perfectly disappeared and was replaced with a sharp absorption at 780 nm characteristic to J-aggregate of the squarylium dye.

COMPARATIVE EXAMPLE 2

The squarylium dye shown in Comparative Example 1 and icosanoic acid were dissolved in chloroform in a molar ratio of the dye to the acid of 1:5. From this solution was prepared in conventional manner a monomolecular film on the surface of water containing cadmium ion. The film was then laminated on a glass substrate to form an LB film with a single layer of the squarylium dye monomolecular film. The LB film was then allowed to stand at room temperature. Two hours after the fabrication of the LB film, there was observed no absorption at 780 nm. After two days standing at room temperature, however, a slight absorption was observed at 780 nm characteristic to the J-aggregate of the squarylium dye.

EXAMPLE 2

An LB film with the same structure as that of Comparative Example 2 was prepared in the same manner as described therein and was treated with magnetic field in the same manner as that in Example 1. By two days magnetic field treatment, an absorption was markedly observed at 780 nm. This suggests that the formation of J-aggregated dye molecules is significantly promoted by the application of the magnetic field.

COMPARATIVE EXAMPLE 3

The squarylium dye shown in Comparative Example 1 was dissolved by itself in chloroform, and the resulting solution was used for the formation of a monomolecular film on the surface of cadmium ion containing water. This film was laminated on a glass substrate which had been overlaid with 5 built up films of cadmium arachate. The lamination of the squarilium monomolecular film was repeated four times more to obtain an LB film having five squarylium monomolecular films built up on the cadmium films provided on the substrate. The LB film was then allowed to stand at room temperature (28°–38° C). No absorption was observed at 780 nm for the LB film after 2 hours standing. Upon 1 day standing, a slight absorption at 780 nm was observed as a shoulder. The absorption at 780 nm was increased with time but the increase was ceased after 5 days with the absorption at 720 nm still remained.

EXAMPLE 3

An LB film with the same structure as that of Comparative Example 3 was prepared in the same manner as that described therein and was subjected to a magnetic field treatment in the same manner as that of Example 1. A slight absorption was observed at 780 nm after two hours magnetic treatment. The absorption at 720 nm disappeared after 5 days treatment, showing the completion of the formation of the J-aggregate of the dye molecules.

EXAMPLE 4

Example 1 was repeated in the same manner as described using a cyanine dye of the formula shown below in place of the squarylium dye:

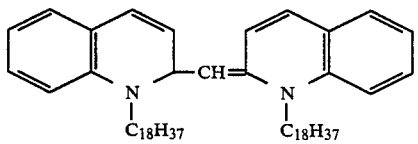

Visible absorption spectrum showed that application of magnetic field was effective in promoting the formation of the J-aggregate of the cyanine dye.

EXAMPLE 5

Example 1 was repeated in the same manner as describe using a merocyanine dye of the formula shown below in place of the squarylium dye:

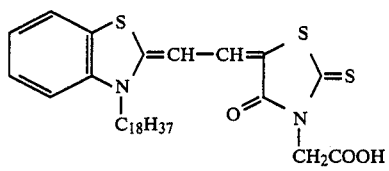

Visible absorption spectrum showed the effectiveness of the magnetic treatment in promoting the formation of J-aggregate of the merocyanine dye.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of forming a Langmuir-Blodgett film containing an organic dye aggregated in the J-state, said method comprising:
   coating a substrate with at least two monomolecular layers of a composition containing the organic dye to form a Langmuir-Blodgett film; and
   subjecting the Langmuir-Blodgett film to a magnetic field to cause the molecules of the organic dye to become aggregated in the J-state.

2. A method as claimed in claim 1, wherein said organic dye is selected from the group consisting of a cyanine dye, a merocyanine dye and a squarylium dye.

3. A method as claimed in claim 1, wherein the magnetic field has a magnetic field strength of 100 G or more.

* * * * *